(12) United States Patent  
Hunter et al.

(10) Patent No.: US 9,129,743 B1  
(45) Date of Patent: Sep. 8, 2015

(54) DISTRIBUTED ARCHITECTURE FOR UNI-DIRECTIONAL AND BI-DIRECTIONAL POWER TRANSFER IN AN ELECTRICAL STORAGE SYSTEM

(75) Inventors: Ian Hunter, Lincoln, MA (US); Serge R. Lafontaine, Lincoln, MA (US)

(73) Assignee: Nucleus Scientific, Inc., Lincoln, MA (US)

( * ) Notice: Subject to any disclaimer, the term of this patent is extended or adjusted under 35 U.S.C. 154(b) by 979 days.

(21) Appl. No.: 13/251,510

(22) Filed: Oct. 3, 2011

Related U.S. Application Data

(60) Provisional application No. 61/405,833, filed on Oct. 22, 2010.

(51) Int. Cl.
  *H01F 27/42* (2006.01)
  *H01F 37/00* (2006.01)
  *H01F 38/00* (2006.01)
  *H01F 30/16* (2006.01)
  *H01F 38/14* (2006.01)

(52) U.S. Cl.
  CPC ............... *H01F 30/16* (2013.01); *H01F 38/14* (2013.01)

(58) Field of Classification Search
  None
  See application file for complete search history.

(56) References Cited

U.S. PATENT DOCUMENTS

| | | | |
|---|---|---|---|
| 5,965,819 A * | 10/1999 | Piety et al. | 73/660 |
| 7,378,754 B2 * | 5/2008 | Shudarek | 307/13 |
| 7,461,707 B2 * | 12/2008 | Gard | 175/170 |
| 7,633,235 B2 | 12/2009 | Boys | 315/209 R |
| 2011/0205087 A1 * | 8/2011 | Kell et al. | 340/932.2 |

\* cited by examiner

*Primary Examiner* — Jared Fureman
*Assistant Examiner* — Aqeel Bukhari
(74) *Attorney, Agent, or Firm* — Sunstein Kann Murphy & Timbers LLP

(57) ABSTRACT

An energy distribution system and methods for coupling a plurality of energy storage cells to at least one of an energy source and an energy load. Each energy storage cell is coupled, at an interface, via a distinct power converter, to a winding, as is an energy source or load, coupled at an energy port to a secondary winding. The plurality of windings sharing a magnetic flux field and thus constitute a transformer. While separate processors are associated with each power converter, a subset of the plurality of processors may be intercoupled for control based on conditions associated with at least one of the plurality of energy storage cells. A central processor may govern operation of a subset of the processors, moreover, a subset of the plurality of processors may also be connected to a local area network and the central processor may communicate with other processors and may also be coupled to an external network such as the internet. Cells are readily switched out individually and recruited to match instantaneous load demand.

22 Claims, 3 Drawing Sheets

DISTRIBUTED ARCHITECTURE FOR UNI-DIRECTIONAL AND BI-DIRECTIONAL POWER TRANSFER IN AN ELECTRICAL STORAGE SYSTEM

RELATED APPLICATION

The present application claims the priority of U.S. Provisional Application Ser. No. 61/405,833, entitled "Distributed Architecture for Uni-Directional and Bi-Directional Power Transfer in an Electrical Storage System," filed on Oct. 22, 2010, and incorporated herein by reference.

TECHNICAL FIELD

The present invention relates to architectures for coupling energy between storage cells and a power source and/or load.

BACKGROUND ART

When energy is stored for delivery in the form of electrical power, it is typically accumulated in one location as potential energy (chemical, electrostatic, nuclear, etc.) or kinetic energy (flywheel, etc.), and then delivered to a load, as needed. Some applications suggest the use of multiple reservoirs of energy, each of which might be referred to as a "cell," to be used cooperatively in the manner of a "battery." Prior art configurations of multiple energy reservoirs include one sort, or another, of electrical coupling among the cells, or mechanical coupling among sources of mechanical energy, whether connected in series or parallel, either permanently or by temporary switching. Electrical coupling among cells presents a number of known drawbacks such as an imbalance for charging purposes if internal cell impedances are mismatched, and system failures in case individual cells become open or shorted. Moreover, electrical coupling of multiple cells may not lend itself to readily swapping out failed cells, or accommodating the overall system to changes in the capacity, or other operating characteristics, of individual cells.

SUMMARY OF EMBODIMENTS OF THE INVENTION

Embodiments of the invention provide for energy distribution and storage as now summarized. Terms are employed in the summary in accordance with definitions provided below.

In accordance with preferred embodiments of the present invention, an energy distribution system is provided for coupling an energy source, or an energy load, or both, to each of a set of energy storage cells. The energy distribution system has a set of power converters, with each power converter coupled through the interface to a distinct one of the energy storage cells. The energy distribution system also has a transformer having a first and a second set of windings. Each winding of the first set of windings is coupled to a distinct one of the power converters, which the second winding is coupled to an energy port for transfer of energy either to a load or from a charger, or both.

In accordance with alternate embodiments of the present invention, the energy storage cell interface may couple each of a set of energy storage cells to an energy load, or to an energy source, or to both. The energy distribution system may also have a plurality of processors, one processor associated with each power converter. A subset of the processors may be intercoupled for control of respective power converters based on conditions associated with at least one of the plurality of energy storage cells. A subset of the plurality of processors may be connected to a local area network and may communicate with other processors for monitoring the system.

In accordance with further embodiments of the present invention, a subset of the processors is coupled to an external network, and any local area network coupling a subset of the processors may be coupled to the internet.

In accordance with another aspect of the present invention, an energy storage and delivery system is provided. The energy storage and delivery system has a plurality of energy storage cells and a set of power converters, each power converter coupled through an interface to a distinct one of the plurality of energy storage cells. The energy storage and delivery system also has a transformer with a first set of windings, each winding coupled to a distinct one of the power converters; and a second set of windings coupled to an energy port for transfer of energy either to a load or from a charger, or both.

In accordance with yet another aspect of the present invention, a method for transferring energy among one or more cells and a load is provided. The method has steps of:

a. coupling each of a set of primary windings of a transformer to an energy storage cell of a plurality of energy storage cells by means of a distinct power converter for each energy storage cell;

b. coupling at least one of an energy source and an energy load to a secondary winding of the transformer; and c. transferring power to a specified energy storage cell of the plurality of energy storage cells.

In alternative embodiments, the method may also include transferring energy to a load by means of the secondary winding. Additionally, it may include transferring energy from a first energy storage cell to a second energy storage cell from among the plurality of energy storage cells. It may further include governing the distinct power converter coupling each of the set of primary windings of the transformer to the energy storage cell by means of a microprocessor.

In other embodiments of the invention, the method for transferring energy among one or more cells and a load may have a step of intercoupling the microprocessors for governing the distinct power converters, and/or governing a subset of the distinct power converters by means of a central processor. It may also include detecting one or more performance characteristics of the respective energy storage cells.

BRIEF DESCRIPTION OF THE DRAWINGS

The foregoing features of the invention will be more readily understood from the following detailed description, considered with reference to the accompanying drawings, in which:

FIG. 2 schematically depicts a system, as that of FIG. 1, in which the flow of power between one or more windings and respective sources or loads is governed by one or more individual processors, in accordance with embodiments of the present invention; and.

DETAILED DESCRIPTION OF SPECIFIC EMBODIMENTS

Definitions

As used in this description and the accompanying claims, the following terms shall have the meanings indicated, unless the context otherwise requires:

An "energy storage cell" is a reservoir of energy. The energy stored in the reservoir may be potential or kinetic energy. It may be chemical, electrostatic, nuclear, mechanical, etc. An example of an electrostatic battery is a capacitor or a supercapacitor. An example of a mechanical energy storage cell is a flywheel. As used herein and in any appended claims, a cell may include "sub-cells," which is to say that a plurality of cells (such as lithium-ion cells, for example) may be electrically connected, in series or in parallel, and the combination may be treated, in the context of the present invention, as a single cell. An energy storage cell may be amenable to charging (as in the case of an electrostatic cell, for example), and may also not lend itself to charging, as in the case of a reservoir of nuclear energy.

A "battery" is an ensemble including one or more energy storage cells.

Figure 1:
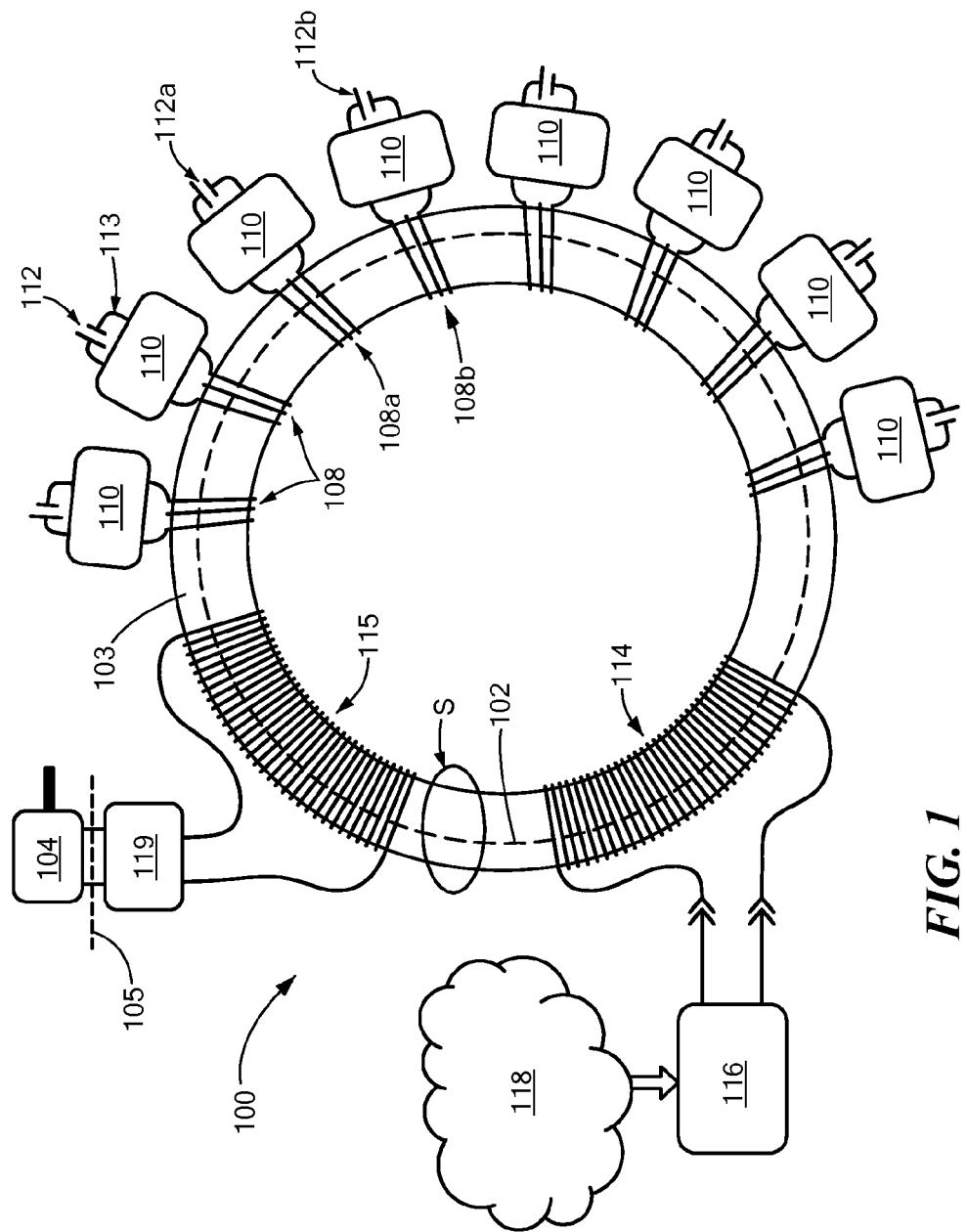
FIG. 1 schematically depicts a system for coupling energy between storage cells and a power source and/or load, in accordance with embodiments of the present invention.

A "transformer" is that which inductively couples two or more associated circuits (113, shown in FIG. 1) by virtue of a plurality of "windings" (108, shown in FIG. 1) sharing a magnetic flux field (102, shown in FIG. 1). A closed path to which a magnetic field is confined may be referred to, herein, as a "magnetic circuit."

A "winding" is that portion of a circuit associated with a transformer that is disposed in a flux field shared with other windings.

An "interface" is a coupling between a first electrical element and one or more other electrical elements, whether mechanically and/or electrically, and whether distinct from, or integral with, the two coupled elements. Thus, if one element is coupled directly to another element, then the interface is not distinct from the two coupled elements, but is integral with the coupled elements by virtue of their coupling.

A "power converter" is any electrical component that modifies the temporal signature of a transmitted current along an electrical path. Thus, for example, switching electronics constitute a converter, as does a rectifier. A power converter, more specifically, may convert between alternating current (AC), or switched current, and direct current (DC).

A "subset" is used to refer either to some, or to all, of the elements of a set.

The configuration of a closed path to which a magnetic field line is confined, thereby allowing the coupling of energy from one electrical circuit to another without direct electrical coupling may be referred to, herein, as a "magnetic circuit."

Embodiments of the present invention are now described with reference to FIG. 1, in which a system for coupling energy among storage cells, or between storage cells and a power source and/or load is designated generally by numeral 100. A magnetic closed loop path, represented generally by dashed line 102, is an abstract concept, indicating the presence of magnetic flux along all area elements transverse to a closed magnetic field line along the closed loop path 102. The aforesaid magnetic flux $\Phi$, through any element S of area transverse to the closed loop path 102 as the integral over the area element S of the magnetic field vector B.

Insofar as there is appreciable magnetic flux along closed loop path 102, it is attributable to a magnetic field that is generated by time variation of electrical current flowing in one or more windings 108. The magnetic field is typically confined in a magnetic core 103 of a ferromagnetic material. Magnetic core 103 may be shaped as a torroid, for example. In preferred embodiments of the invention, magnetic core 103 is comprised of an amorphous metal (such as Metglas®), thereby reducing hysteretic losses.

Each winding 108 (noting that a winding may include one or more loops around closed loop path 102) is electrically coupled to its individual power converter 110 which is bi-directional in that it converts between DC current flowing in an energy storage cell 112 and time-varying current flowing in winding 108. Energy storage cell 112 may be of any of the kinds enumerated above among the definitions, and, in a preferred embodiment of the present invention, is a lithium-ion rechargeable battery. Each power converter 110 may also condition the current, either unilaterally or bilaterally, and thus also serve as a power conditioner.

In one aspect of operation of the energy storage system, AC current may be induced in the winding due to variation in the magnetic field, while, in another case, energy may be supplied by the cell and introduced into the magnetic field. In the former case, alternating current is rectified before being used for charging cell 112, while, in the latter case, direct current supplied by cell 112 is switched to provide a time-varying current in winding 108 and thereby induce a magnetic field B is closed path loop 102. Since the current-handling requirements of power converters 110 are limited by the distributed system design, lower cost technologies may advantageously be incorporated into system design, such as insulated-gate bipolar transistors (IGBTs), that might otherwise not meet overall system power handling requirements.

While one set of windings 108 serve to couple individual cells to the magnetic flux along closed loop path 102, an additional winding 114 serves, similarly, to couple energy in the magnetic field along closed loop path 102 to a power source 118, which may identically be referred to as a "charger," where "power source" or "charger" are to be understood in full generality, and may include any sort of reservoir of energy or mechanism, such as electrical generator, whereby energy in the form of flowing charge carriers is made available.

Power source 118 may require flow conditioning, such as switching, voltage conversion, etc., and provided by power converter 116. Analogously, a winding 115, similarly disposed about closed loop path 102, may be provided to couple power provided by one or more of cells 112 and power source 118 to one or more external loads, represented, in FIG. 1, by motor 104, although, any load 104 is within the scope of the present invention. To the extent to which power conditioning is required to match winding 115 to load 104, it is provided by power conditioner 119. Load 104 is coupled to power conditioner 119 at energy port 105, and may also represent a source, in cases, such as that of a motor/generator, where it is an electromechanical device that may also provide power for the system. Winding 115, for coupling energy to load 104 (which may, as discussed above, additionally serve as a source), may be referred to herein, and in any attached claims, as a "secondary winding," to distinguish it with respect to windings coupling individual energy storage cells 112 to the magnetic field, which latter windings 108 may be referred to as "primary windings."

When energy cells 112 are not included in the system 100 for distributing energy, the system may be referred to as "an energy distribution system." When the energy cells 112 are included, the system 100 may be referred to as "an energy storage and delivery system." Both energy distribution systems and energy storage and delivery systems are within the scope of the present invention.

In the embodiment shown in FIG. 1, each power converter 110 is directly coupled to a circuit containing cells 112, thus the interface coupling between the set of power conditioners and the set of cells is integral with the set of power conditioners by virtue of their coupling to the cells. In alternate embodiments of the invention, intermediary interface structures may be provided, such as a housing containing each cell, for example, and any such interface is within the scope of the present invention.

One of the advantages of the present invention is that it may allow energy to be transferred from the magnetic field along closed loop path 102 at different rates either to, or from, distinct cells, such as 112(a) and 112(b). For example, depending upon the charge state of a particular cell, one cell 112(a) may be delivering power to the magnetic field, while a second cell 112(b) may be charging.

Embodiments of the present invention may advantageously remove vulnerability to failure or degradation of individual cells 112. The system as whole may be rendered immune to the failure of individual cells to charge or to deliver power. Accordingly, cells which either fail to provide power, or constitute power drains, may be removed, for example, by opening a local circuit 113 containing a defective cell.

Another advantage that may be provided by embodiments of the present invention is that individual cells 112 may readily be installed, removed, or switched out. Thus, greater flexibility may be achieved with respect to the size, weight, total energy capacity, etc., of each replaceable unit. One or more individual cells 112 may be switched out without exposing personnel to the cumulative voltage that may be developed across the system as a whole. No more that the voltage across a single cell 112 need be exposed at once. Similarly, the available current during a servicing operation may be limited to the current that may be developed by a single cell, and, or, thus, safely limited.

Yet a further advantage of embodiments of the present invention lies in the flexibility provided with respect to design standards and geometries, such that cell placement may conform to available volumetric constraints. Cells having varying capacities may be incorporated into a single system 100, affording great flexibility of design.

Figure 2:
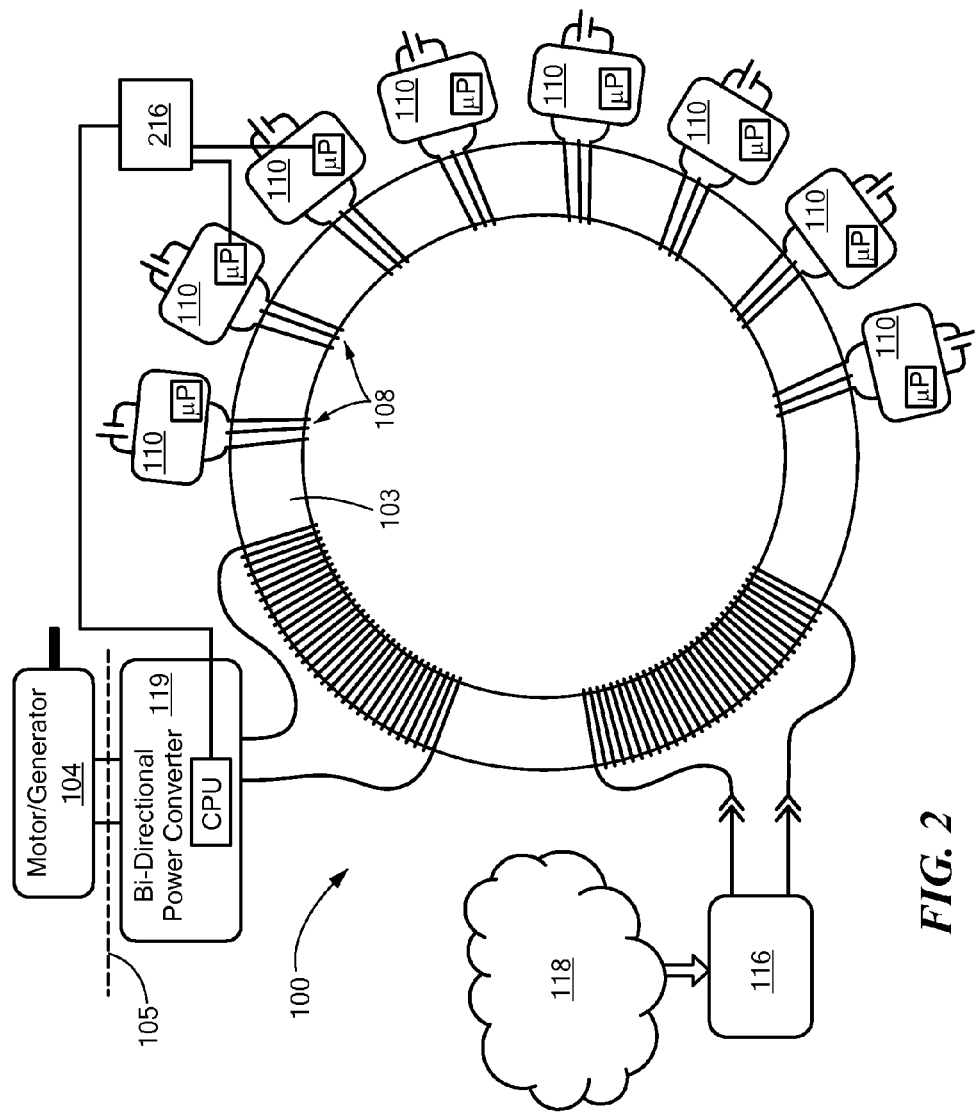

Configuration of an electrical storage system 100 may be achieved not only in overall design of the system but in real time, as now described with reference to FIGS. 2 and 3. In FIG. 2, windings 108 about magnetic core 103 are coupled to respective energy storage cells 112 by power converters 110 that are governed by microprocessors 210, designated as μP. As discussed above, power converters 110 are bi-directional in that they convert between DC current flowing in energy storage cell 112 and time varying current flowing in winding 108. Microprocessors 210 may have both autonomous functionality, responding to performance conditions (charge, temperature, internal impedance, etc.) of cell 112 and may also respond to other microprocessors 210 of the system, as well as to system-wide conditions such as load, etc. The degree of power coupling between cells 112 and magnetic core 103 may be modulated by pulse width modulation (PWM), switching rates and temporal profiles, etc. Moreover, a central processor 216 may govern one or more of the microprocessors 210 that control power converters 110 as well as a processor 212 that controls the coupling of load/source 104 to the electrical storage system 100.

Individual processors 210 as well as the central processor 216 may be called upon to track historical performance data so that routine or preventative maintenance may be performed, thereby maintaining reliable, continuous, operation of the system. An individual cell 112 that fails to meet performance criteria may be identified by an individual processor 210 or by a central processor 216 and excluded from operation of electrical storage system 100 until the defective cell is switched out.

Figure 3:
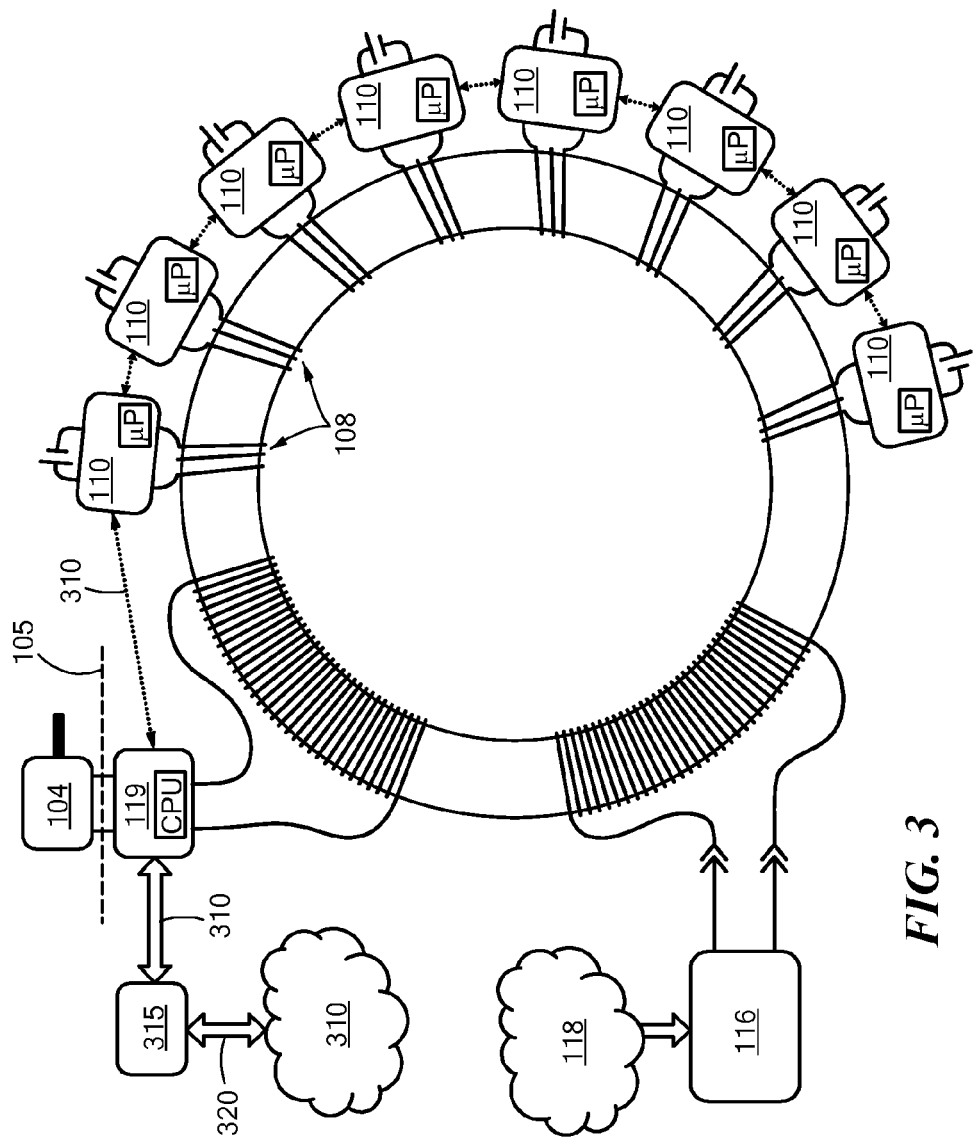
FIG. 3 schematically depicts a system, as that of FIG. 1, in which the flow of power between one or more windings and respective sources or loads is governed via a network, either indigenously or remotely, in accordance with embodiments of the present invention.

As shown in FIG. 3, communication among individual microprocessors 210 as well as their communication to one or more central processors 216 may occur via any manner of communication link or buss, or local area network (LAN) 310, moreover, a central processor 315 may, in turn, be controlled remotely by any manner of coupling, including networking, via channel 320, to a network 310 external to the electrical storage system 100. The external network 310 may be the Internet. Coupling of a processor to one or more other processors may be referred to, herein, as "intercoupling."

In a mode of operation of electrical storage system 100, a subset of individual cells 112 may deliver power to a load 104 under certain operating conditions, whereas, under conditions of increased load beyond a specified criterion, additional cells may be "recruited" and brought on-line, to deliver additional power to match instantaneous load demand, for example. Moreover, the subset of cells delivering power may be rotated to distribute cell burden and extend system maintenance intervals.

Electrical storage systems in accordance with embodiments of the present invention may advantageously serve for the charging of electric vehicles or many other applications. The embodiments of the invention described herein are intended to be merely exemplary; numerous variations and modifications will be apparent to those skilled in the art. All such variations and modifications are intended to be within the scope of the present invention as defined in any appended claims.

What is claimed is:

1. A system for use with a set of energy storage cells, the system comprising:
    a. a plurality of local circuits, each local circuit adapted to be coupled to a distinct energy storage cell of the set of energy storage cells;
    b. a set of bi-directional power converters, each power converter coupled to a distinct one of the plurality of local circuits;
    c a transformer having
        (i) a first set of windings, each winding coupled to a distinct one of the set of bi-directional power converters; and
        (ii) a second winding coupled to an energy port for transfer of energy either to a load or from a power source.

2. The system of claim 1, wherein the transformer couples each of a set of energy storage cells to an energy load.

3. The system of claim 1, wherein the transformer couples each of a set of energy storage cells to both an energy source and an energy load.

4. The system of claim 1, further comprising a plurality of processors, one processor associated with each power converter.

5. The system of claim 4, wherein a subset of the plurality of processors are intercoupled for control based on conditions associated with at least one of the plurality of energy storage cells.

6. The system of claim 4, wherein a subset of the plurality of processors is connected to a local area network.

7. The system of claim 4, wherein a subset of the plurality of processors is coupled to a network external to the energy distribution system.

8. The system of claim 7, wherein the local area network is coupled to the Internet.

9. An energy storage and delivery system, the system comprising:
   a. a plurality of energy storage cells;
   b. a set of bi-directional power converters, each bi-directional power converter coupled to a distinct one of the plurality of energy storage cells;
   c a transformer including:
      (i) a first set of windings, each winding coupled to a distinct one of the power converters; and
      (ii) a second set of windings coupled to an energy port for transfer of energy either to a load or from a charger, or both.

10. The energy storage and delivery system of claim 9, further comprising a plurality of processors, one processor associated with each power converter.

11. The energy storage and delivery system of claim 10, wherein a subset of the plurality of processors are intercoupled for control based on conditions associated with at least one of the plurality of energy storage cells.

12. The energy storage and delivery system of claim 10, wherein a subset of the plurality of processors is connected to a local area network.

13. The energy storage and delivery system of claim 10, wherein a subset of the plurality of processors is coupled to a network external to the energy storage and delivery system.

14. The energy storage and delivery system of claim 13, wherein the local area network is coupled to the Internet.

15. A method for transferring energy among a plurality of energy storage cells and a load or a source, the method comprising:
   a. coupling each of a set of primary windings of a transformer to an energy storage cell of the plurality of energy storage cells by means of a distinct power converter for each energy storage cell;
   b. coupling at least one of an energy source and an energy load to a secondary winding of the transformer; and
   c. transferring power to a specified energy storage cell of the plurality of energy storage cells.

16. The method of claim 15, further comprising transferring energy to a load by means of the secondary winding.

17. The method of claim 15, further comprising transferring energy from a first energy storage cell to a second energy storage cell from among the plurality of energy storage cells.

18. The method of claim 15, further comprising governing the distinct power converter coupling each of the set of primary windings of the transformer to the energy storage cell by means of a microprocessor.

19. The method of claim 18, further comprising intercoupling the microprocessors for governing the distinct power converters.

20. The method of claim 19, further comprising governing a subset of the distinct power converters by means of a central processor.

21. The method of claim 15, further comprising detecting one or more performance characteristics of each energy storage cell.

22. A system for use with a set of energy storage cells, the system comprising:
   a. a plurality of local circuits, each local circuit adapted to be coupled to a distinct energy storage cell of the plurality of energy storage cells;
   b. a transformer having
      (i) a first set of windings, each winding coupled to a distinct one of the plurality of local circuits; and
      (ii) a second winding coupled to an energy port for transfer of energy either to a load or from a power source;
   c. a set of processors for selectively enabling and disabling an electrical connection between each of the first set of windings of the transformer to a respective energy storage cell of the set of energy storage cells via a respective power converter.

* * * * *